(12) United States Patent
Gorham, Jr.

(10) Patent No.: US 8,818,465 B1
(45) Date of Patent: Aug. 26, 2014

(54) HOLDER FOR CONNECTING A MOBILE PHONE TO THE SEATBELT OF A VEHICLE AND METHOD OF USE

(76) Inventor: William Edward Gorham, Jr., Fairfax, VA (US)

(*) Notice: Subject to any disclaimer, the term of this patent is extended or adjusted under 35 U.S.C. 154(b) by 345 days.

(21) Appl. No.: 13/441,970

(22) Filed: Apr. 9, 2012

Related U.S. Application Data

(60) Provisional application No. 61/572,324, filed on Jul. 14, 2011.

(51) Int. Cl.
*H04M 1/00* (2006.01)

(52) U.S. Cl.
USPC ............... 455/575.1; 455/575.6; 455/575.9; 455/90.3

(58) Field of Classification Search
USPC .......... 455/575.9, 575.1, 569.1, 569.2, 575.4, 455/575.6, 90.3, 550.1; 379/455
See application file for complete search history.

(56) References Cited

U.S. PATENT DOCUMENTS

| | | | | |
|---|---|---|---|---|
| 5,668,869 A | * | 9/1997 | Zinno | 379/449 |
| D489,890 S | | 5/2004 | Gorham, Jr. | |
| D507,872 S | * | 8/2005 | Watson | D3/218 |
| 6,922,876 B2 | * | 8/2005 | Kobayashi | 24/633 |
| 7,213,308 B2 | * | 5/2007 | Kobayashi | 24/633 |
| D572,901 S | * | 7/2008 | St. George | D3/218 |
| 8,068,888 B2 | * | 11/2011 | Ross, III | 455/575.8 |
| 8,428,665 B1 | * | 4/2013 | McLaughlin et al. | 455/575.1 |
| 2011/0000945 A1 | * | 1/2011 | Mongan et al. | 224/581 |
| 2011/0132950 A1 | * | 6/2011 | Culver | 224/485 |

* cited by examiner

*Primary Examiner* — Pablo Tran
(74) *Attorney, Agent, or Firm* — Ted Masters

(57) ABSTRACT

A holder for connecting a mobile phone to the seatbelt of a vehicle includes a front side which receives the mobile phone, and a back side which connects the holder to the seatbelt. The front side includes a mobile phone retainer which holds the mobile phone in the holder. The back side includes a seatbelt connector for connecting the holder to the seatbelt. The connector includes two seatbelt retainers which are shaped and dimensioned to receive the seatbelt. The holder also includes friction enhancing members which keep the holder at a desired position on the seatbelt.

3 Claims, 9 Drawing Sheets

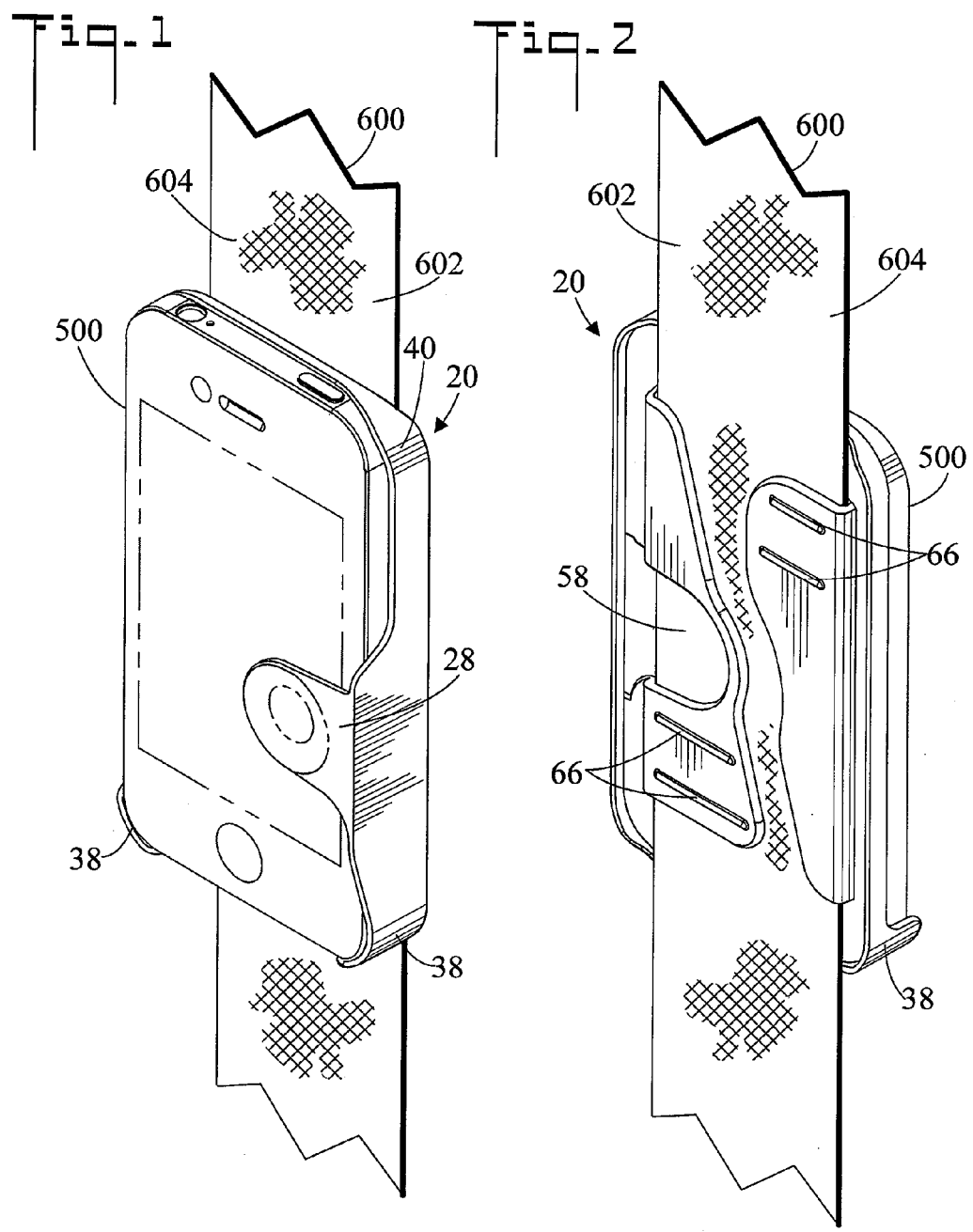

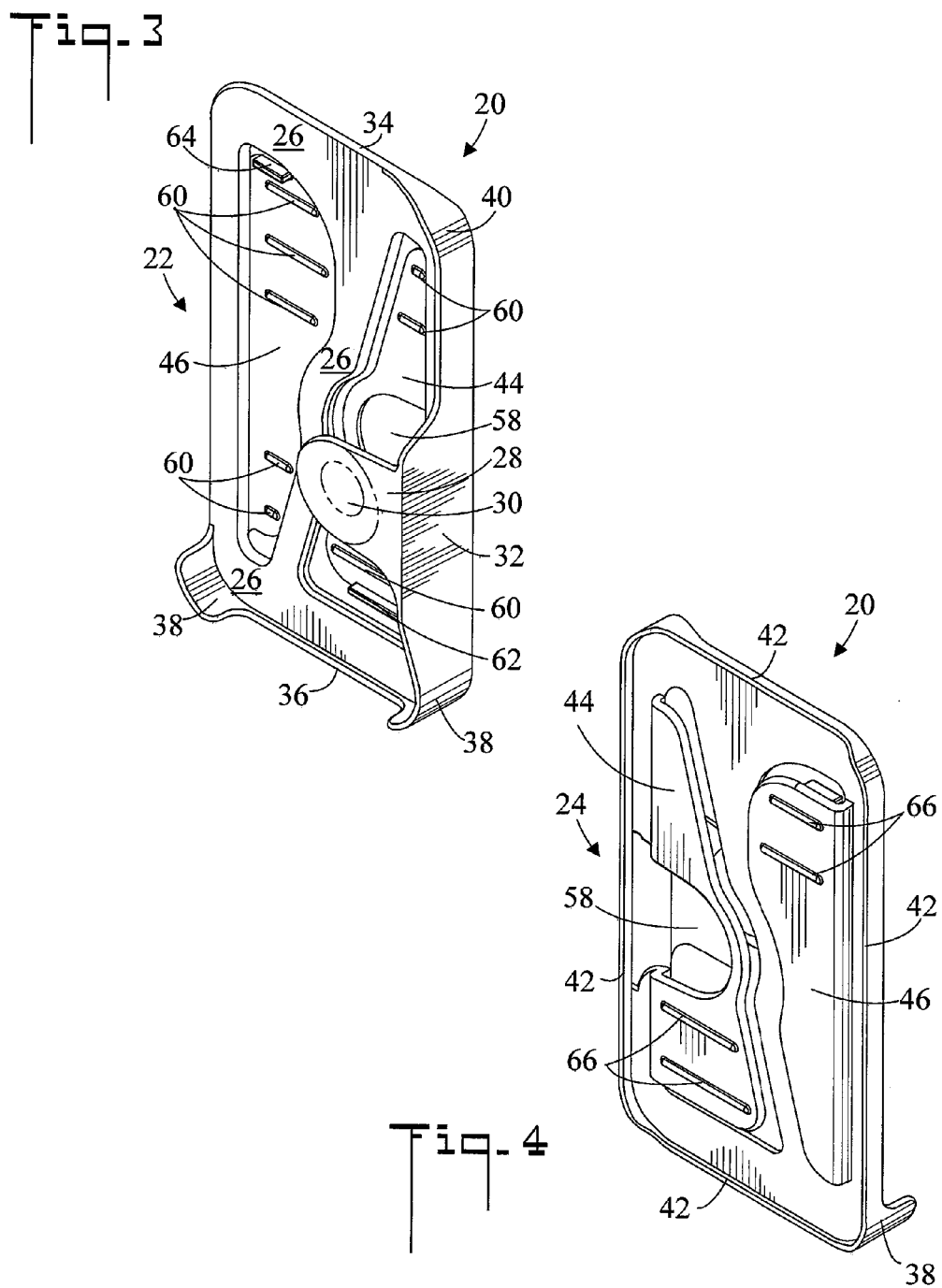

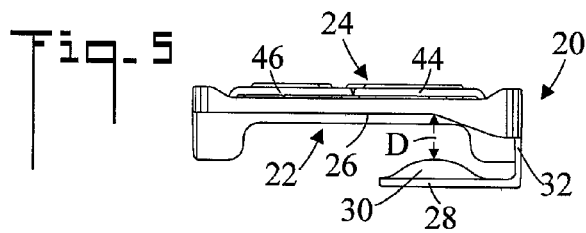
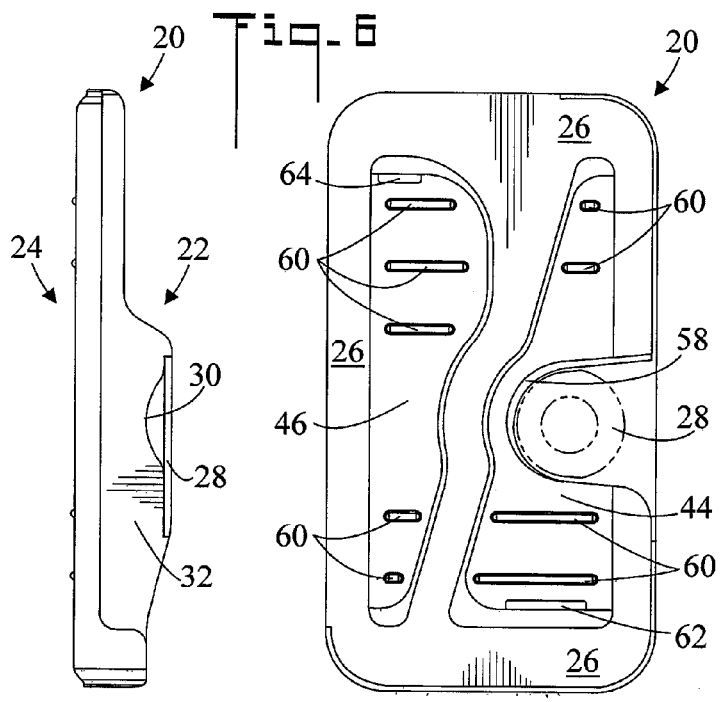
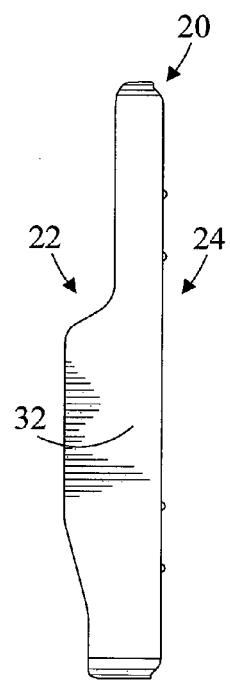
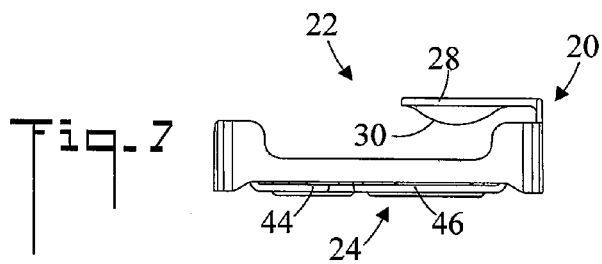

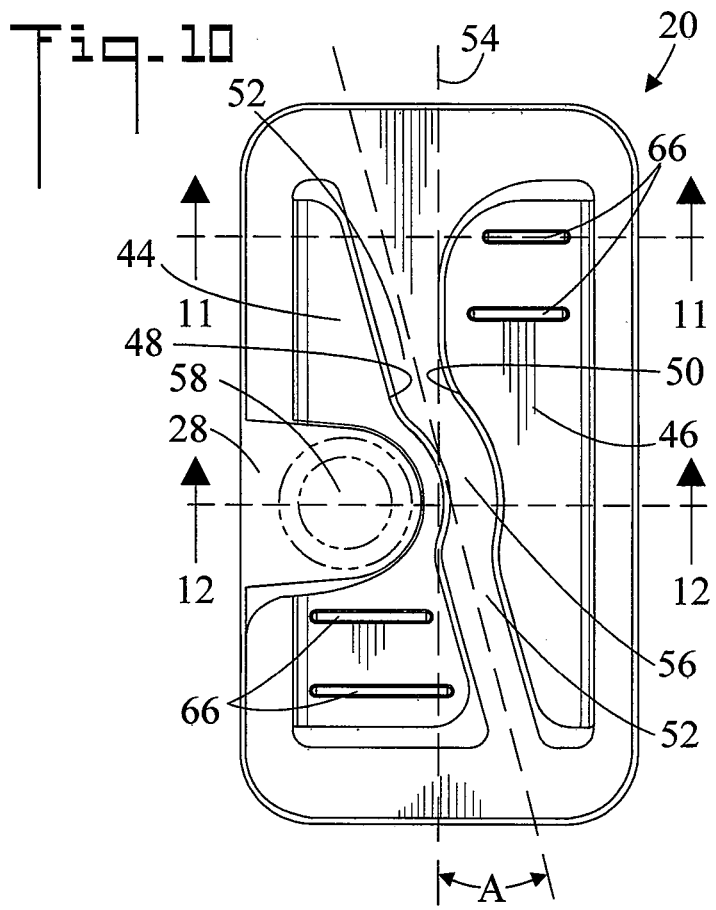
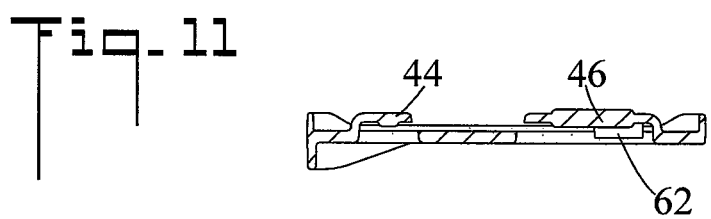
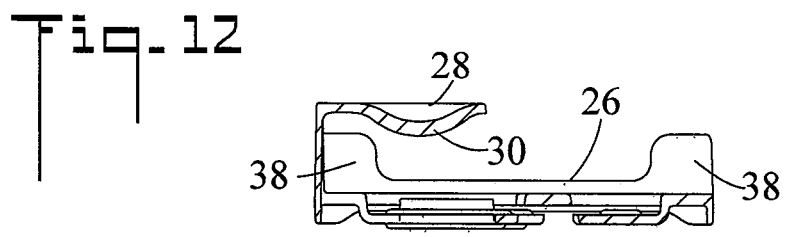

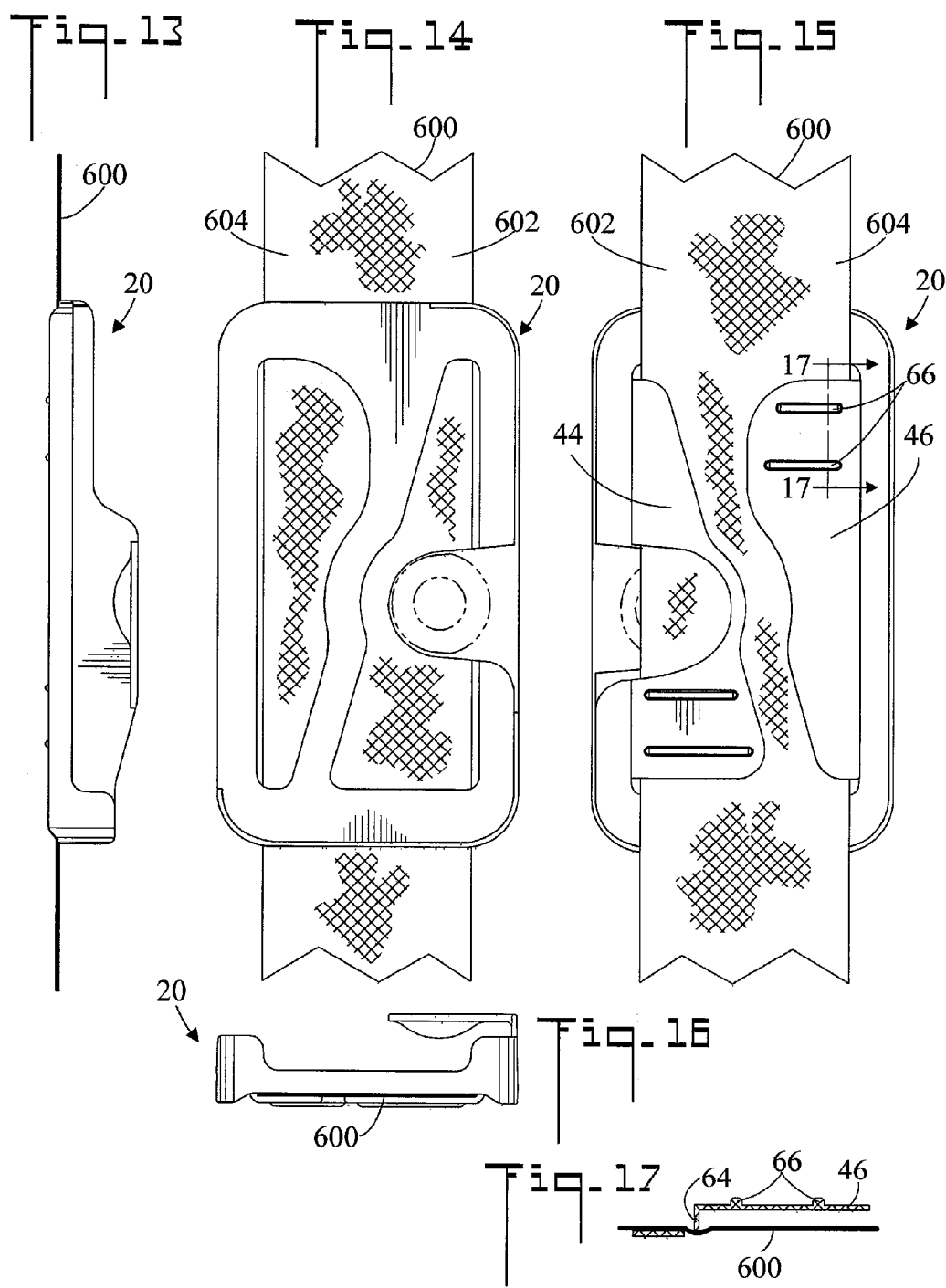

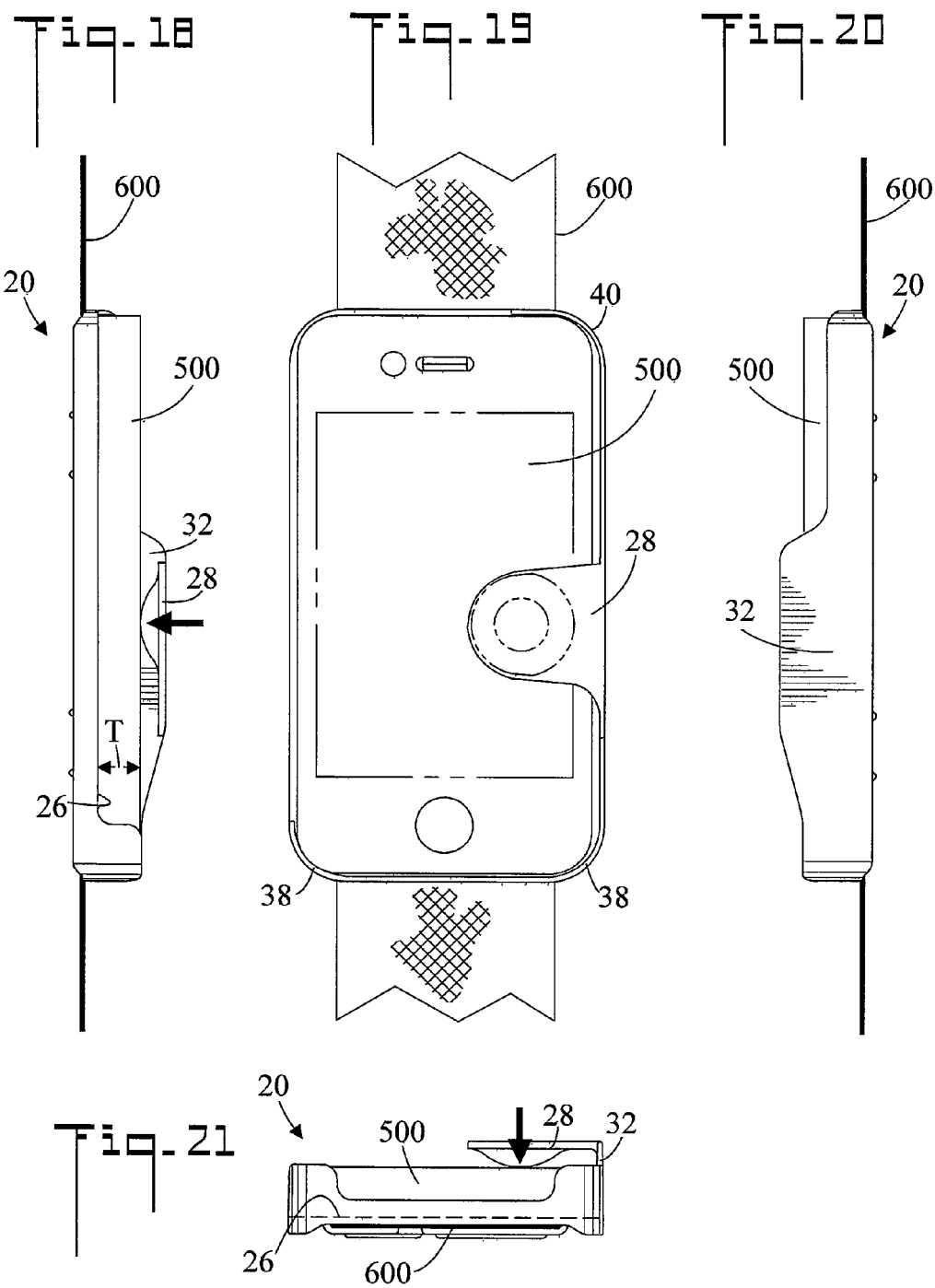

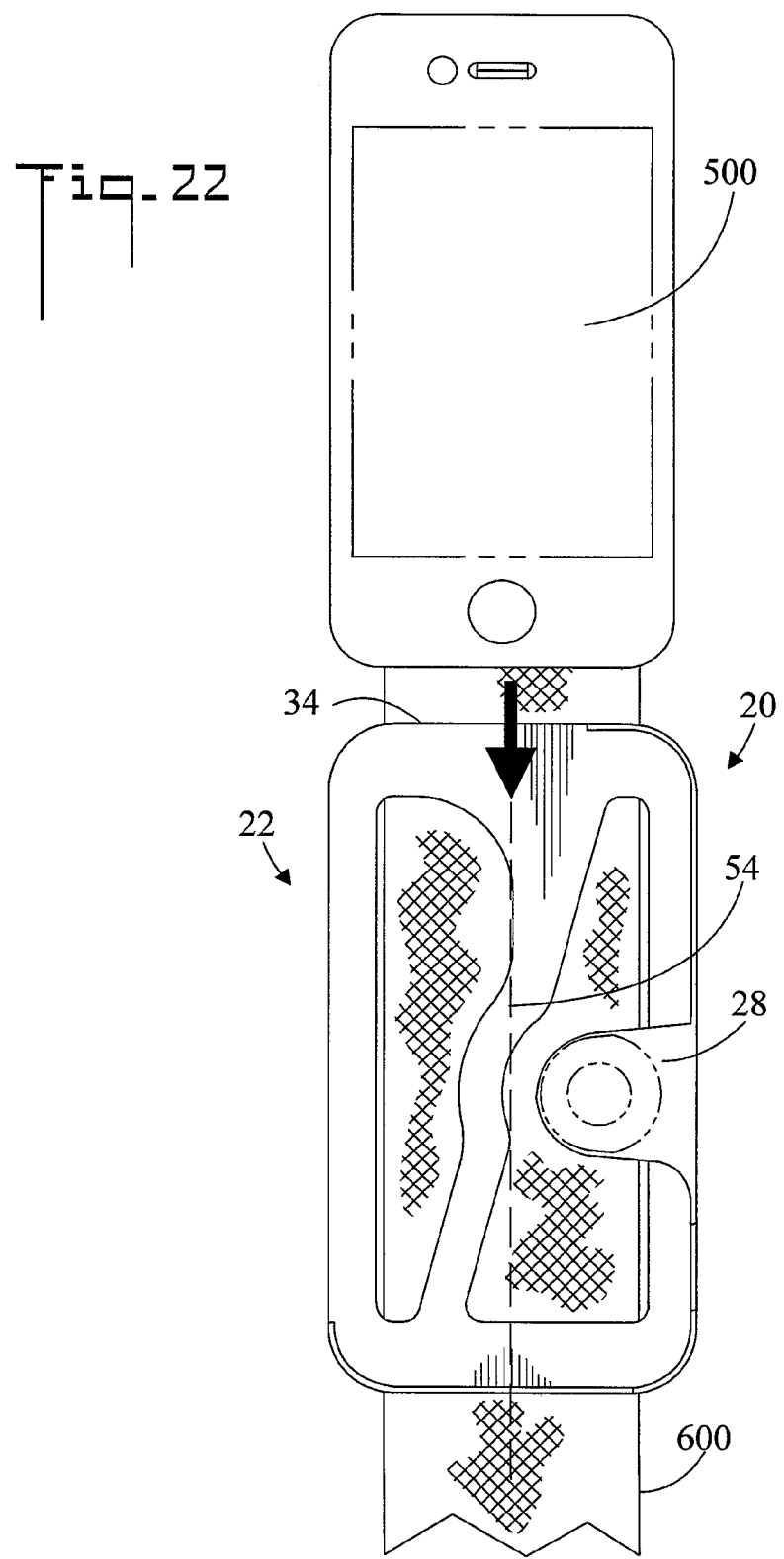

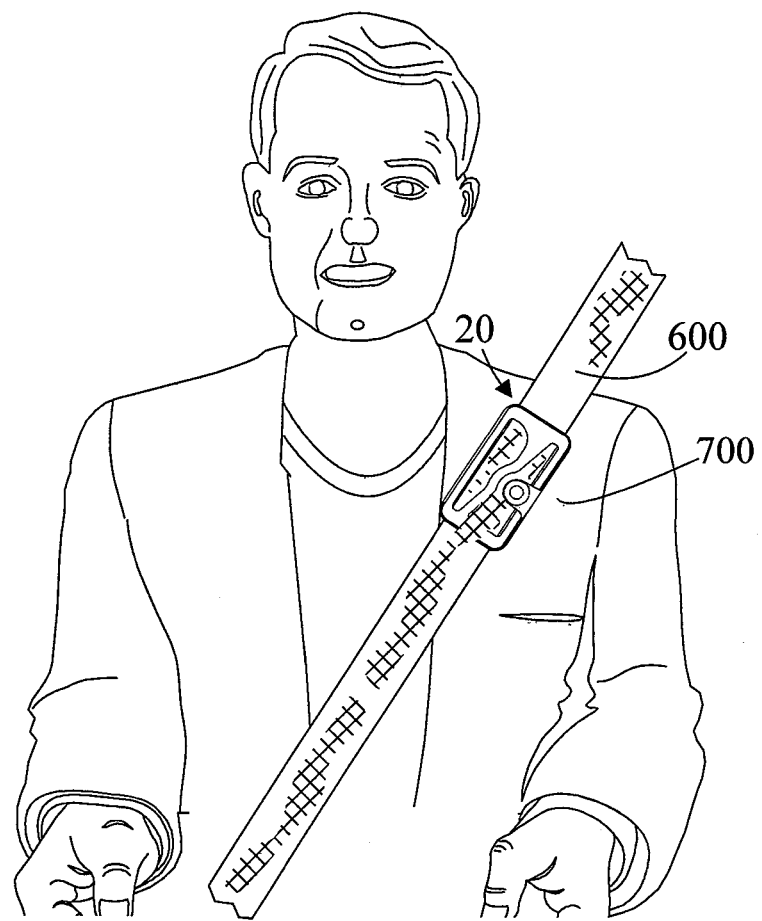

HOLDER FOR CONNECTING A MOBILE PHONE TO THE SEATBELT OF A VEHICLE AND METHOD OF USE

CROSS REFERENCE TO RELATED APPLICATION

This application claims the filing benefit under 35 U.S.C. §119(e) of U.S. Provisional Application No. 61/572,324, filed Jul. 14, 2011, which is hereby incorporated by reference.

TECHNICAL FIELD

The present invention pertains generally to mobile phones, and more particularly to a mobile phone holder which attaches to the seatbelt of a motor vehicle.

BACKGROUND OF THE INVENTION

The use of mobile phones (aka cell phones) by the drivers of motor vehicles is wide spread. However the use requires the driver to take one hand off of the steering wheel, and therefore increases the probability of an accident. In fact, some states prohibit drivers from using cell phones unless the use is "hands free" such as through a local area audio network (e.g. bluetooth).

In view of the above, it would be desirable to provide a mobile phone holder which securely holds the phone and allows the driver to communicate in a hands free mode while driving a motor vehicle.

BRIEF SUMMARY OF THE INVENTION

The present invention is directed to a mobile phone holder which attaches to the seatbelt of a motor vehicle. The holder snuggly holds the mobile phone, and makes it possible for a user to talk and listen without having to dedicate one hand to holding the phone (i.e. allows communication in a "hands free" mode). By using the holder, a user can talk and listen while driving and keep two hands on the steering wheel. Without the holder, a user would have to hold the phone in one hand and drive with the other, or would have to use a local area audio network device.

The mobile phone holder fits all seatbelts, and is easily installed. It also is slim and provides no discomfort to the drivers. Moreover, the World Health Organization recently announced that repeatedly holding a cell phone against the head can cause cancer. The use of a speaker phone reduces that health threat. The mobile phone holder has no moving parts, which makes it durable and less likely to malfunction.

In accordance with an embodiment, a holder for connecting a mobile phone to the seatbelt of a vehicle includes a front side and an opposite back side. The front side includes a mobile phone-receiving surface and a mobile phone retainer which is spaced apart from the mobile phone-receiving surface. The mobile phone is positionable between the mobile-phone-receiving surface and the mobile phone retainer. The back side includes a seatbelt connector for connecting the holder to the seatbelt.

In accordance with another embodiment, the mobile phone has a thickness. The mobile phone retainer is resiliently connected to the mobile phone-receiving surface. The mobile phone-receiving surface is spaced apart a distance from the mobile phone retainer, the distance being slightly less than the thickness of the mobile phone. So that when the mobile phone is positioned between the mobile phone-receiving surface and the mobile phone retainer, the mobile phone retainer resiliently urges the mobile phone toward the mobile phone-receiving surface thereby clamping the mobile phone therebetween.

In accordance with another embodiment, the mobile phone retainer includes a rounded portion which projects toward the mobile phone-receiving surface, the rounded portion contacting the mobile phone.

In accordance with another embodiment, the front side has a top end and an opposite bottom end. The bottom end has at least one mobile phone-retaining flange, and the top end has at least one mobile phone-retaining flange.

In accordance with another embodiment, the seatbelt has a first transverse side and an opposite second transverse side. The seatbelt connector includes a first seatbelt retainer spaced apart from a second seatbelt retainer, the first seatbelt retainer is shaped and dimensioned to receive and engage the first transverse side of the seatbelt, and the second seatbelt retainer is shaped and dimensioned to receive and engage the second transverse side of the seatbelt. The seatbelt is positionable underneath the first and second seatbelt retainers.

In accordance with another embodiment, the first seatbelt retainer has a first edge and said second seatbelt retainer has a second edge. The first and second edges are spaced apart to form a passage through which the seatbelt can be passed.

In accordance with another embodiment, the holder has a longitudinal axis with a curved central portion. The passage forms an angle with the longitudinal axis.

In accordance with another embodiment, the first and second seatbelt retainers each have at least one friction enhancing ridge which promotes friction between the first and second seatbelt retainers and the seatbelt.

In accordance with another embodiment, the first seatbelt retainer has a first wall which abuts the seatbelt and increases the force required to slide the holder along the seatbelt.

In accordance with another embodiment, the second seatbelt retainer has a second wall which abuts the seatbelt and increases the force required to slide the holder along the seatbelt.

In accordance with another embodiment, when connected to the seatbelt the holder abuts the body of a user. The first and second seatbelt retainers each have at least one friction enhancing ridge which promotes friction between said first and second seatbelt retainers and the body of the user.

In accordance with another embodiment, the first seatbelt retainer has a hole which is slightly larger than the mobile phone retainer.

In accordance with another embodiment, the back side includes a perimeter. A strength-enhancing ridge is disposed around the perimeter.

Other embodiments, in addition to the embodiments enumerated above, will become apparent from the following detailed description, taken in conjunction with the accompanying drawings, which illustrate, by way of example, the principles of the holder and method of use.

BRIEF DESCRIPTION OF THE DRAWINGS

FIG. 1 is a front perspective view of a holder connecting a mobile phone to the seatbelt of a vehicle;

FIG. 2 is a rear perspective view of the holder, the mobile phone, and the seatbelt;

FIG. 3 is a front perspective view of the holder;

FIG. 4 is a rear perspective view of the holder;

FIG. 5 is a top plan view of the holder;

FIG. 6 is a front elevation view of the holder;

FIG. 7 is a bottom plan view of the holder;

FIG. 8 is a side elevation view of the holder;

FIG. 9 is an opposite side elevation view of the holder;

FIG. 10 is a rear elevation view of the holder;

FIG. 11 is a cross sectional view along the line 11-11 of FIG. 10;

FIG. 12 is a cross sectional view along the line 12-12 of FIG. 10;

FIG. 13 a side elevation view of the holder connected to the seatbelt;

FIG. 14 is a front elevation view of the holder connected to the seatbelt;

FIG. 15 is a rear elevation view of the holder connected to the seatbelt;

FIG. 16 is a bottom plan view of the holder connected to the seatbelt;

FIG. 17 is an enlarged cross sectional view along the line 17-17 of FIG. 15;

FIG. 18 is a side elevation view of the holder connected to the seatbelt and the mobile phone positioned in the holder;

FIG. 19 is a front elevation view of the holder connected to the seatbelt and the mobile phone positioned in the holder;

FIG. 20 is an opposite side elevation view of the holder connected to the seatbelt and the mobile phone positioned in the holder;

FIG. 21 is a bottom plan view of the holder connected to the seatbelt and the mobile phone positioned in the holder;

FIG. 22 is a front elevation view of the mobile phone being positioned in the holder;

FIG. 23 is a reduced front elevation view of the holder connected to the seatbelt of a user residing in a vehicle; and, FIG. 24 is a reduced front elevation view of the holder, mobile phone, seatbelt, and the user.

DETAILED DESCRIPTION OF THE INVENTION

Figure 24:
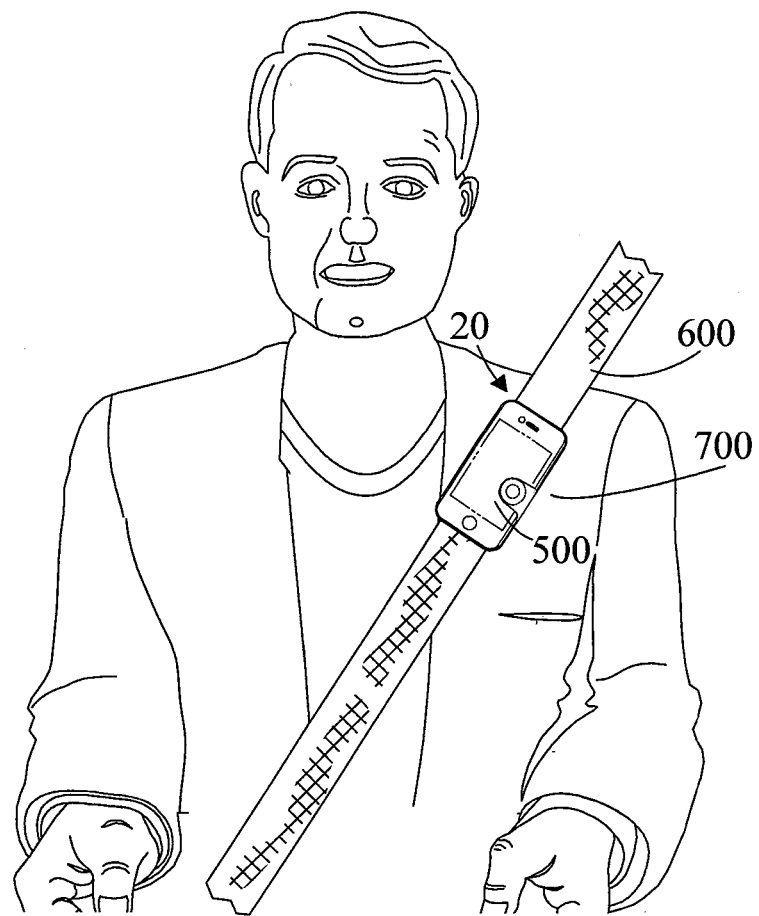

Referring initially to FIGS. 1 and 2, there are illustrated front perspective and rear perspective views respectively of a holder for connecting a mobile phone 500 to the seatbelt 600 of a vehicle, the holder generally designated as 20. FIGS. 3-10 are front perspective, rear perspective, top plan, front elevation, bottom plan, side elevation, opposite side elevation, and rear elevation views respectively of holder 20. Holder 20 includes a front side 22 which accepts mobile phone 500, and an opposite back side 24 which connects to seatbelt 600. Front side 22 includes a mobile phone-receiving surface 26 and a mobile phone retainer 28 which is spaced apart from mobile phone-receiving surface 26. As can be best seen in FIG. 5, mobile phone retainer 28 extends substantially parallel to mobile phone-receiving surface 26. Mobile phone retainer 28 includes a rounded portion 30 which projects toward mobile phone-receiving surface 26, rounded portion 30 contacting mobile phone 500. In the shown embodiment, rounded portion 30 is created by hollowing out the outward surface of mobile phone retainer 28 (also refer to FIG. 12). Mobile phone 500 is positionable between mobile-phone-receiving surface 26 and mobile phone retainer 28 (refer also to FIGS. 18-21).

Referring to FIG. 18, mobile phone 500 has a thickness T. Mobile phone retainer 28 is resiliently connected to mobile phone-receiving surface 26 by side wall 32. Mobile phone-receiving surface 26 is spaced apart a distance D from mobile phone retainer 28 (refer to FIG. 5), distance D being slightly less than thickness T of mobile phone 500, so that when mobile phone 500 is positioned between mobile phone-receiving surface 26 and mobile phone retainer 28, mobile phone retainer 28 resiliently urges mobile phone 500 toward mobile phone-receiving surface 26 thereby clamping mobile phone 500 therebetween. Referring to FIG. 3, front side 22 of holder 20 has a top end 34 and an opposite bottom end 36. Bottom end 36 has at least one mobile phone-retaining flange 38 (two in the shown embodiment). Top end 34 has at least one mobile phone-retaining flange 40 (one in the shown embodiment). Referring to FIG. 4, back side 24 includes a perimeter. A strength-enhancing ridge 42 is disposed around the perimeter.

Back side 24 includes a seatbelt connector for connecting holder 20 to the seatbelt 600. Once connected, the connector allows holder 20 to be selectively moved along the length of seatbelt 600. However, once holder 20 has been moved to a desired position along seatbelt 500, the connector serves as an "anti-slip" device which causes holder 20 to remain in the desired position.

Seatbelt 600 has a first transverse side 602 and an opposite second transverse side 604. The seatbelt connector includes a first seatbelt retainer 44 spaced apart from a second seatbelt retainer 46. Referring also to FIG. 15, first seatbelt retainer 44 is shaped and dimensioned to receive and engage first transverse side 602 of seatbelt 600, and second seatbelt retainer 46 is shaped and dimensioned to receive and engage second transverse side 604 of seatbelt 600. Seatbelt 600 is positionable underneath first 44 and second 46 seatbelt retainers. When so positioned, holder 20 is connected to seatbelt 600. The positioning is made possible by the fact that seatbelt 600 is flexible and can be bent so that it is positioned underneath first 44 and second 46 seatbelt retainers.

Referring to FIG. 10, first seatbelt retainer 44 has a first edge 48 and said second seatbelt retainer having a second edge 50. First 48 and second 50 edges are spaced apart to form a passage 52 through which seatbelt 600 can be passed. Holder 20 has a longitudinal axis 54. Passage 52 forms and angle A with longitudinal axis 54. Further, in the shown embodiment passage 52 has a curved central portion 56. Also, first seatbelt retainer 44 has a hole 58 (also refer to FIGS. 1 and 3) which is slightly larger than mobile phone retainer 28. Hole 58 necessitates the curvature of central portion 56 of passage 52, and facilitates the fabrication of holder 20 by a injection molding process.

Referring to FIGS. 3 and 6, first 44 and second 46 seatbelt retainers each having at least one friction enhancing ridge 60 which promotes friction between first 44 and second 46 seatbelt retainers and seatbelt 600. Moreover, first seatbelt retainer 44 has a first wall 62 which abuts seatbelt 600 and increases the force required to slide holder 20 along seatbelt 600, and similarly second seatbelt retainer 46 has a second wall 64 which abuts seatbelt 600 and increases the force required to slide holder 20 along seatbelt 600 (also refer to FIG. 17).

Also referring to FIGS. 23 and 24, when holder 20 is connected to seatbelt 600, holder 20 abuts the body 700 of a user. Referring to FIGS. 2, 4 and 10, first 44 and second 46 seatbelt retainers each have at least one friction enhancing ridge 66 which promotes friction between first 44 and second 46 seatbelt retainers and the body 700 of the user. Ridges 60, walls 62 and 64, and ridges 66 combine to comprise the "anti-slip" device which retains holder 20 in a desired position along seatbelt 600.

FIG. 11 is a cross sectional view along the line 11-11 of FIG. 10, showing first 44 and second seatbelt retainers and first wall 62.

FIG. 12 is a cross sectional view along the line 12-12 of FIG. 10, showing rounded portion 30 of mobile phone retainer 28, mobile phone-receiving surface 26, and mobile phone-retaining flanges 38.

FIG. 13-16 are side elevation, front elevation, rear elevation, and bottom plan views respectively of holder 20 connected to seatbelt 600, and FIG. 17 is an enlarged cross sectional view along the line 17-17 of FIG. 15. Shown are seatbelt 600 having first transverse side 602 and second transverse side 604, first seatbelt retainer 44, second seatbelt retainer 46, and second wall 64. First 44 and second 46 seatbelt retainers laterally lock holder 20 to seatbelt 600. It is noted that first wall 62 abuts seatbelt 600 in a similar fashion as second wall 64 in FIG. 17.

FIGS. 18-21 are side elevation front elevation, opposite side elevation, and bottom plan views respectively of holder 20 connected to seatbelt 600 and mobile phone 500 positioned in holder 20. Shown are mobile phone 500 having thickness T, seatbelt 600, holder 20, mobile phone-receiving surface 26, and mobile phone retainer 28. It is noted that mobile phone retainer 28 is resiliently connected to side wall 32 which is also connected to mobile phone-receiving surface 26. As such, mobile phone retainer 28 pushes mobile phone 500 in the direction of the arrows (FIGS. 18 and 21). It is noted that mobile phone 50 is also held in place by mobile phone-retaining flanges 38 and 40.

FIG. 22 is a front elevation view of mobile phone 500 being positioned in holder 20. Mobile phone 500 is moved in the direction of the arrow generally along longitudinal axis 54 from top 34 end of front side 22 and positioned under mobile phone retainer 28 as is shown in FIGS. 1 and 18-21.

FIG. 23 is a reduced front elevation view of holder 20 connected to the seatbelt 600 of a user residing in a vehicle. The back side of holder 20 abuts the body 700 of the user.

FIG. 24 is a reduced front elevation view of holder 20 with mobile phone 500 installed, seatbelt 600, and the body 700 of the user. It is noted that the front sides of holder 20 are low so that the user can conveniently plug in a charger and control volume. With practice the installation of mobile phone 500 in holder 20, the operation of mobile phone 500, and the removal of mobile phone 500 from holder 20 can be accomplished without looking at mobile phone 500. When placed in holder 20, the user uses mobile phone 500 to place a call and turns on the phone's "speaker phone" function. The user then talks with the called party, and when finished pushes the "off" button on mobile phone 500. Mobile phone 500 remains in mobile phone holder 20 until the user prepares to exit the motor vehicle. At that time, the user removes mobile phone 500 from holder 20, but leaves holder 20 in place on seatbelt 600.

In an embodiment, holder 20 is designed for use with an iPhone® 4, and is approximately 4.77 inches long, approximately 2.62 inches wide, and approximately 0.8 inches thick. However, it may be appreciated that the dimensions of holder 20 can be changed to accommodate mobile phones having other dimensions. In an embodiment, holder 20 is fabricated from a polymer via injection molding. Holder 20 is semi-ridged so that it can deform slightly when accepting mobile phone 500.

A method for using a mobile phone 500 in a vehicle, includes: (Refer to FIGS. 1-24):

(a) providing a mobile phone 500;

(b) providing a vehicle having a seatbelt 600;

(c) providing a holder 20 for connecting mobile phone 500 to seatbelt 600, holder 20 including;

a front side 22 and an opposite back side 24;

front side 22 including a mobile phone-receiving surface 26 and a mobile phone retainer 28 which is spaced apart from mobile phone-receiving surface 26, mobile phone 500 is positionable between mobile-phone-receiving surface 26 and mobile phone retainer 28; and, back side 24 including a seatbelt connector for connecting holder 20 to seatbelt 600;

(d) using the seatbelt connector to connect holder 20 to seatbelt 600; and, (e) positioning mobile phone in holder 20 between mobile phone-receiving surface 26 and mobile phone retainer 28.

The method further including:

in (b), seatbelt 600 having a first transverse side 602 and an opposite second transverse side 604;

in (c), the seatbelt connector including a first seatbelt retainer 44 spaced apart from a second seatbelt retainer 46, first seatbelt retainer 44 shaped and dimensioned to receive and engage first transverse side 602 of seatbelt 60, and second seatbelt retainer 46 shaped and dimensioned to receive and engage second transverse side 604 of seatbelt 600; and, in (d), positioning seatbelt 600 underneath first 44 and second 46 seatbelt retainers.

The method further including:

in (c), first 44 and second 46 seatbelt retainers each having at least one friction enhancing ridge 60 which promotes friction between first 44 and second 46 seatbelt retainers and seatbelt 600; and, in (d) the at least one friction enhancing ridge 60 contacting seatbelt 600.

The method further including:

in (c), first seatbelt retainer 44 having a first wall 62 which abuts seatbelt 600 and increases the force required to slide holder 20 along seatbelt 600; and, in (d), first wall 62 abutting seatbelt 600.

The method further including, holder 20 being used by a user having a body 700:

in (c), first 44 and second 46 seatbelt retainers each having at least one friction enhancing ridge 66 which promotes friction between first 44 and second 46 seatbelt retainers and the body 700 of the user.

in (d), the at least on friction enhancing ridge 66 abutting the body 700 of the user.

The method further including:

in (a), mobile phone 500 having a thickness T;

in (c), mobile phone retainer 28 resiliently connected to mobile phone-receiving surface 26, mobile phone-receiving surface 26 spaced apart a distance D from mobile phone retainer 28, distance D being slightly less than thickness T of mobile phone 500, so that when mobile phone 500 is positioned between mobile phone-receiving surface 26 and mobile phone retainer 28, mobile phone retainer 28 resiliently urges mobile phone 500 toward mobile phone-receiving surface 26 thereby clamping mobile phone 500 therebetween; and, in (e), mobile phone retainer 28 urging mobile phone 500 toward mobile phone receiving surface 26.

The method further including:

in (c), mobile phone retainer 28 including a rounded portion 30 which projects toward mobile phone-receiving surface 26; and, in (e), rounded portion 30 contacting mobile phone 500.

The method further including:

in (c), front side 22 having a top end 34 and an opposite bottom end, 36, bottom end 34 having at least one mobile phone-retaining flange 38; and, in (e), the at least one mobile phone-retaining flange 38 holding mobile phone 500 in holder 20.

The embodiments of the holder and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the holder and method should be construed as limiting the invention to a particular embodiment or combination of embodiments. The scope of the invention is defined by the appended claims.

I claim:

1. A holder for connecting a mobile phone to the seatbelt of a vehicle, the mobile phone having a thickness, the holder comprising:
   a front side and an opposite back side;
   said front side including a mobile phone-receiving surface and a mobile phone retainer which is spaced apart from said mobile phone-receiving surface, the mobile phone positionable between said mobile-phone-receiving surface and said mobile phone retainer;
   said back side including a seatbelt connector for connecting said holder to the seatbelt;
   said mobile phone retainer resiliently connected to said mobile phone-receiving surface;
   said mobile phone-receiving surface spaced apart a distance from said mobile phone retainer, said distance being slightly less than the thickness of the mobile phone, so that when the mobile phone is positioned between said mobile phone-receiving surface and said mobile phone retainer, said mobile phone retainer resiliently urges the mobile phone toward said mobile phone-receiving surface thereby clamping the mobile phone therebetween; and,
   said mobile phone retainer including a rounded portion which projects toward said mobile phone-receiving surface, said rounded portion contacting the mobile phone.

2. A holder for connecting a mobile phone to the seatbelt of a vehicle, the seatbelt having a first transverse side and an opposite second transverse side, the holder comprising:
   a front side and an opposite back side;
   said front side including a mobile phone-receiving surface and a mobile phone retainer which is spaced apart from said mobile phone-receiving surface, the mobile phone positionable between said mobile-phone-receiving surface and said mobile hone retainer;
   said back side including a seatbelt connector for connecting said holder to the seatbelt;
   said seatbelt connector including a first seatbelt retainer spaced apart from a second seatbelt retainer, said first seatbelt retainer shaped and dimensioned to receive and engage the first transverse side of the seatbelt, and said second seatbelt retainer shaped and dimensioned to receive and engage the second transverse side of the seatbelt;
   the seatbelt positionable underneath said first and second seatbelt retainers; and,
   said first seatbelt retainer having a hole which is slightly larger than said mobile phone retainer.

3. A holder for connecting a mobile phone to the seatbelt of a vehicle, the seatbelt having a first transverse side and an opposite second transverse side, when connected to the seatbelt the holder abutting the body of a user, the holder comprising:
   a front side and an opposite back side;
   said back side including a seatbelt connector for connecting said holder to the seatbelt;
   said seatbelt connector including a first seatbelt retainer spaced apart from a second seatbelt retainer, said first seatbelt retainer shaped and dimensioned to receive and engage the first transverse side of the seatbelt, and said second seatbelt retainer shaped and dimensioned to receive and engage the second transverse side of the seatbelt;
   the seatbelt positionable underneath said first and second seatbelt retainers; and,
   said first and second seatbelt retainers each having at least one friction enhancing ridge which promotes friction between said first and second seatbelt retainers and the body of the user.

* * * * *